US011415256B2

(12) United States Patent
Lemaire et al.

(10) Patent No.: US 11,415,256 B2
(45) Date of Patent: Aug. 16, 2022

(54) APPARATUS FOR THE SEPARATION OR LIQUEFACTION OF A GAS OPERATING AT CRYOGENIC TEMPERATURES

(71) Applicant: L'Air Liquide, Societe Anonyme pour l'Etude et l'Exploitation des Procedes Georges Claude, Paris (FR)

(72) Inventors: Yann-Pierrick Lemaire, Paris (FR); Patrick Le Bot, Champigny-sur-Marne (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 285 days.

(21) Appl. No.: 16/712,279

(22) Filed: Dec. 12, 2019

(65) Prior Publication Data

US 2021/0180736 A1    Jun. 17, 2021

(51) Int. Cl.
*F16L 43/00* (2006.01)
*F25J 3/00* (2006.01)
*F25J 3/04* (2006.01)
*F25J 1/02* (2006.01)

(52) U.S. Cl.
CPC ........... *F16L 43/002* (2013.01); *F25J 1/0232* (2013.01); *F25J 3/044* (2013.01); *F25J 3/04872* (2013.01); *F25J 3/04896* (2013.01); *F25J 2290/60* (2013.01)

(58) Field of Classification Search
CPC ...... F15D 1/04; F25J 2290/30; F25J 2290/40; F25J 2290/62; F25J 2200/94; F16L 43/00; F16L 43/01; F16L 43/002; F16L 43/003; F16L 43/001
See application file for complete search history.

(56) References Cited

U.S. PATENT DOCUMENTS

| 2,662,553 | A | * | 12/1953 | Dimmock | ................. F15D 1/04 138/37 |
| 2006/0086141 | A1 | * | 4/2006 | Cote | .................... F25J 3/04878 62/643 |
| 2010/0175425 | A1 | | 7/2010 | Walther | |
| 2017/0198988 | A1 | | 7/2017 | Herring | |

FOREIGN PATENT DOCUMENTS

| DE | 21 2016 000 060 U1 | 11/2017 |
| JP | 60023785 | 2/1985 |
| JP | 10253286 | 9/1998 |

OTHER PUBLICATIONS

French Search Report and Written Opinion for corresponding FR1872853, dated Dec. 13, 2018.

\* cited by examiner

*Primary Examiner* — Jianying C Atkisson
*Assistant Examiner* — Erik Mendoza-Wilkenfel
(74) *Attorney, Agent, or Firm* — Justin K. Murray

(57) ABSTRACT

An apparatus for the separation or liquefaction of a gas at cryogenic temperatures which comprises an isolated chamber comprises at least one front distillation column operating at cryogenic temperatures and also a pipe for transferring fluid coming from or going to the column, the pipe having a diameter D comprising a bend for changing the direction of flow of the fluid, with profiled deflector vanes placed inside the bend, with their concavity towards the centre of the bend forming a plurality of ducts.

10 Claims, 4 Drawing Sheets

APPARATUS FOR THE SEPARATION OR LIQUEFACTION OF A GAS OPERATING AT CRYOGENIC TEMPERATURES

CROSS REFERENCE TO RELATED APPLICATIONS

This application claims the benefit of priority under 35 U.S.C. § 119 (a) and (b) to French patent application No. FR1872853, filed Dec. 13, 2018, the entire contents of which are incorporated herein by reference.

FIELD OF THE INVENTION

The present invention relates to an apparatus for the separation or liquefaction of a gas operating at cryogenic temperatures, in particular to an apparatus for the separation of air by cryogenic distillation.

BACKGROUND OF THE INVENTION

With the progress made in terms of performance qualities of packings for distillation columns, said columns have increasingly small diameters. Conversely, the sizes of the pipework transporting the liquids and gases of the process to the column inlets/outlets have not decreased.

Consequently, the footprint of cold boxes is increasingly more constrained by the pipework than by the columns themselves. In addition, this pipework also creates pressure drop and thus contributes to increasing the separation energy expended.

It is therefore important to develop a design suitable for the pipework that makes it possible to reduce the specific separation energy of a gas, for example of air, and/or to reduce the footprint of the cold box.

In apparatuses for the separation of a fluid at cryogenic temperature, a change in direction of pipework occurs by means of a bend. They may have several designs, but when the diameter of pipework is too high (>40 inches or 101.6 cm), it is technically necessary to insert mitred bends, since rounded bends are not economically viable above a certain size.

Mitred bends are produced by welding several sectors of straight pipework that are cut, with precise angles, to ultimately obtain the desired angle.

The sectors are constituted by toric segments articulated about their common axis.

The drawback of these types of bend is their footprint. This is because, in order to reduce the pressure drop linked to the change in direction, it is known practice to increase the curvature of the bend. However, the footprint then becomes too great for installation in cold boxes. It is recommended to adhere to a ratio of the radius of curvature R to the diameter D of the pipework of greater than or equal to 1, generally greater than or equal to 1.5 D.

An R/D of less than 1 is also possible, but this will be to the detriment of the pressure drops.

SUMMARY OF THE INVENTION

Vane bends have potential for meeting the objectives of reducing the specific separation energy of a gas, for example of air, and/or of reducing the footprint of the cold box.

According to one subject of the invention, an apparatus for the separation or liquefaction of a gas at cryogenic temperatures is provided, which comprises an isolated chamber comprising at least one front element operating at cryogenic temperatures, which is a distillation column, and also a pipe for transferring fluid coming from or going to the element, the pipe having a diameter D comprising a bend for changing the direction of flow of the fluid, characterized in that:

i) the bend does not comprise a curvature, or alternatively comprises a curvature for which the ratio of the radius of curvature R to the diameter D of the pipe is less than (0.5 D+x)/D where x is equal to 0 or greater than 0 and less than 0.5 D, ii) profiled deflector vanes are placed inside the bend, with their concavity towards the centre of the bend forming a plurality of parallel curved ducts.

According to other optional aspects of the invention:
the apparatus comprises at least two vanes aligned parallel to one another along the bisector of the bend;
the apparatus comprises at least five vanes aligned parallel to one another along the bisector of the bend;
the bend forms a right angle;
the fluid is gaseous air to be separated, sent via the pipe to the distillation column;
the fluid is gaseous nitrogen coming from the distillation column;
the diameter of the pipe is greater than 101.6 cm;
at least one vane extends out of the bend;
the bend is located between the element and a wall of the chamber;
the ratio of the radius of curvature R to the diameter D of the pipe is less than 1, preferably less than 0.7;
the R/D ratio is greater than 0.5;
the footprint of the bend is less than 1.5 D, preferably less than 1.2 D.

BRIEF DESCRIPTION OF THE DRAWINGS

Further features and advantages of the invention will become apparent from the description hereinafter of embodiments, which are given by way of illustration but without any limitation, the description being given in relation with the following attached figures.

DETAILED DESCRIPTION OF THE INVENTION

Figure 1:
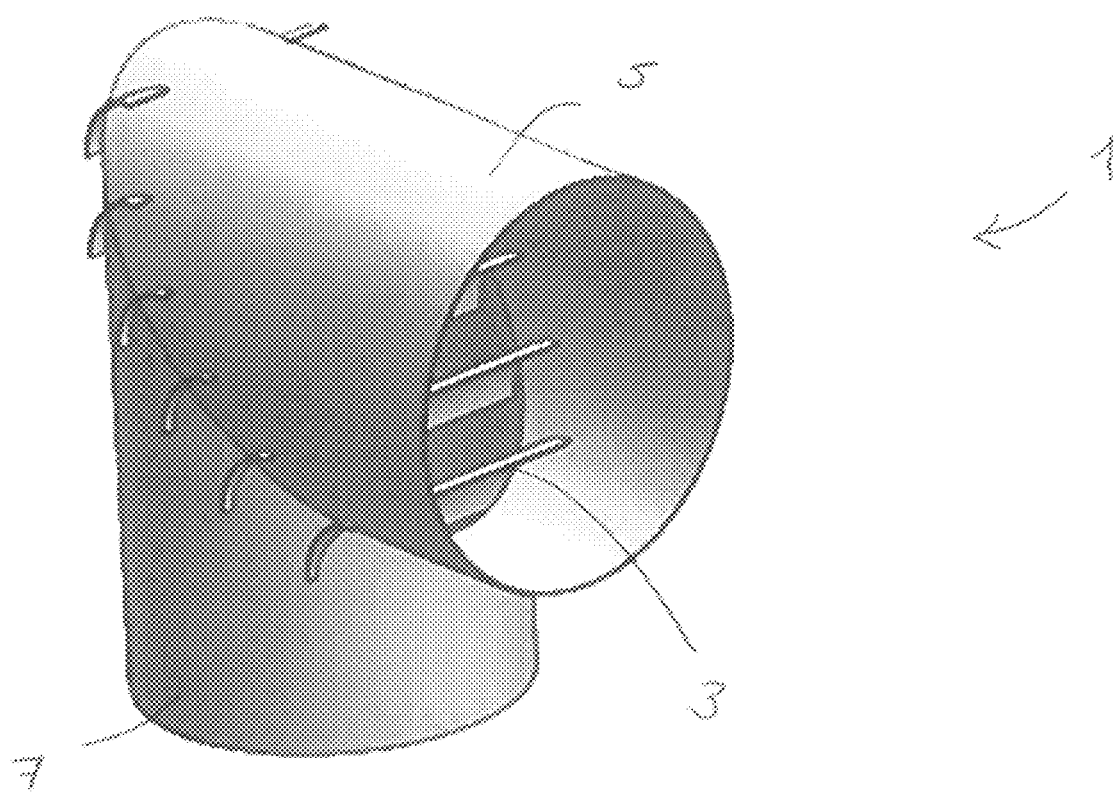
FIG. 1 shows a bend according to the invention seen from the exterior.

FIG. 1 represents a view of a bend intended to be part of an apparatus for the separation or liquefaction of a gas at cryogenic temperatures comprising an isolated chamber. In this chamber are at least one front element operating at cryogenic temperatures, which is a distillation column, and also a pipe for transferring fluid coming from or going to the element. This pipe comprises a bend 1 for changing the direction of flow of the fluid, which pipe does not comprise a curvature, as illustrated in FIG. 1, or alternatively it comprises a curvature for which the ratio of the radius of curvature R to the diameter D of the pipe is (0.5 D+x)/D where x is less than 0.5 D.

For a 90° bend, the ratio would be less than 1, preferably less than 0.7.

Profiled deflector vanes 3 are placed inside the bend with their concavity towards the centre C of the bend, in order to form therein a plurality of substantially parallel curved ducts. A fluid (liquid or gas) sent in the pipe changes flow direction by following the curved ducts between the profiled vanes.

In the bend there is a grid of vanes which has the effect of modifying the direction of the gaseous or liquid stream entering the bend by making it turn 90°. These vanes 3, preferably made of thin sheet metal, will be calculated according to the known methods for determining aerodynamic profiles to obtain the desired uniform deviation of the gas stream. They deflect the (liquid or gaseous) fluid streams and send them back in the direction of the exit of the bend. They considerably decrease the static pressures upstream of the bend, while they lessen the detachment within the bend.

The vanes 3 have a crescent-shaped profile with a median plane of symmetry and rectilinear generatrixes in the plane of the bend, these vanes turning their concavity towards the centre of the bend and preferably being aligned along the bisector of the bend.

The vanes 3 are preferably placed at equal distance from one another.

The ducts delimited between the vanes 3 all have the same width.

FIG. 1 shows that at least some vanes can be installed by sliding them into curved slits formed in the bend 1 so that the ends of the vane remain at the end of the bend.

The vanes may be entirely within the bend. However, if the ends of the vanes are on the outside, this facilitates manufacturing since the sites to be welded are more easily accessible for installing the vanes.

The bend is made up of two mitred segments 5, 7, one of which is connected to the front element operating at cryogenic temperature. This element may be a distillation column.

The diameter of the segment 5, 7, and thus of the pipe which goes to the element, may have any size, but the invention provides an additional advantage when this diameter exceeds 40', thus 101.6 cm.

Figure 2:
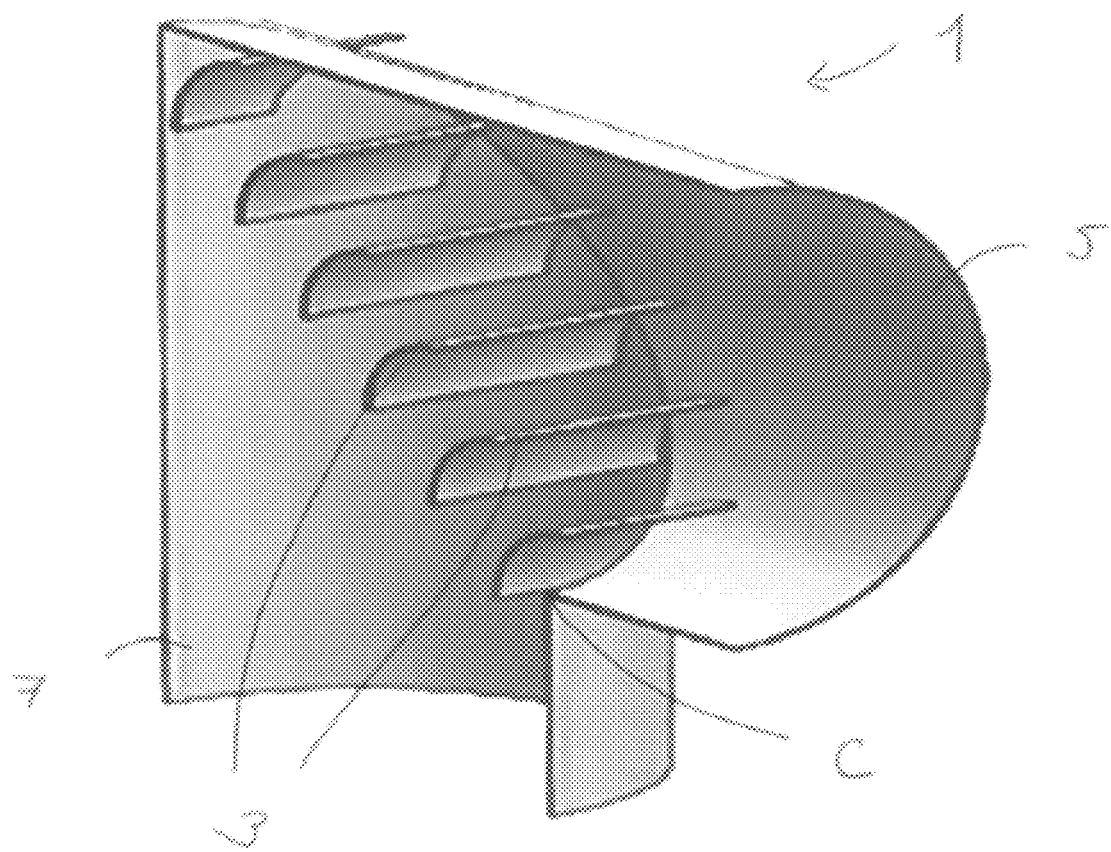
FIG. 2 shows a bend according to the invention.

FIG. 2 shows the six vanes inside the bend in an exploded-view drawing of the bend 1.

Figure 3:
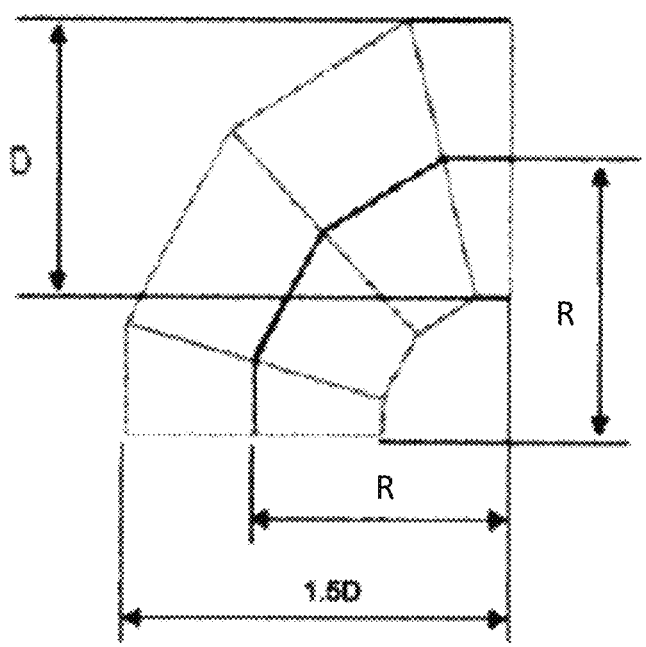
FIG. 3 represents a bend according to the prior art.
Figure 4:
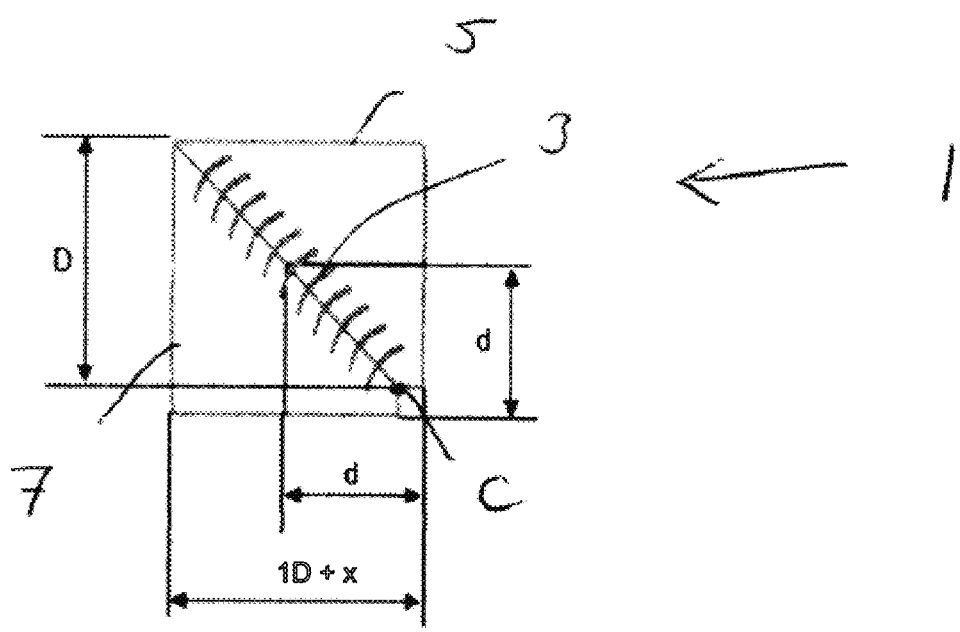
FIG. 4 represents a cross section of a bend according to the invention.

Contrary to mitred bends, the vane bends [FIG. 4] which are the subject of the invention do not have to adhere to the R/D ratio of greater than or equal to 1 for the pipework because they do not have a radius of curvature. This is because, considering only the neutral fibre, it is formed by two segments, whereas for mitred bends, it is made up of several small segments which define a curve [FIG. 3]. In the example of FIG. 3 illustrating the prior art with two small segments between the pipe ends, the R/D ratio is 1 since the radius of curvature is equal to D. It is seen that the footprint of the bend is 1.5 D, which means that the cold box must be designed to contain this space in order to contain the curve of the bend with a distance of 1.5 D on the ground.

In the case of FIG. 4, according to the invention, the bend 1, in this case composed of two mitred segments 5, 7, contains eleven vanes 3 which have a crescent-shaped profile with a median plane of symmetry and rectilinear generatrixes perpendicular to the plane of the bend, these vanes turning their concavity towards the centre C of the bend and preferably being aligned along the bisector of the bend.

Because of the presence of the vanes, it is possible to reduce the curve of the bend to the minimum, and thus the bend forms a right angle.

It is also possible to imagine a bend having a radius of curvature according to the invention, by adding vanes to a structure similar to that of FIG. 3 with a radius of curvature d and a pipe diameter D.

In this case, the d/D ratio is less than (0.5 D+x)/D where x is 0 or less than 0.5 D, typically about 0.1 D.

The distance required for the construction of the bend is denoted by x.

Thus, it is seen that the footprint of the bend is in this case limited to 1 D+x.

The bend may for example receive gaseous nitrogen from the medium-pressure column or the low-pressure column of a double column for separation of air by cryogenic distillation. For the case where the low-pressure column is involved, the bend will typically be located between the top of the low-pressure column and the wall of the chamber containing the column. Reducing the dimensions of the bend thus makes it possible to place the wall closer to the column and thus to reduce the dimensions of the chamber.

One of the advantages of the use of such vane bends is that they make it possible to save space by virtue of their better compactness (with identical pipework size).

Moreover, the design of the vane bends confers on them a positive impact regarding pressure drops.

The singular pressure drop coefficient of a vane bend is approximately 60% lower than a mitred bend. This means that a vane bend creates 60% less pressure drop than a mitred bend.

These savings in terms of pressure drops can then result, in two different ways:

Either in a reduction in pipework, that is to say conserved separation energy but for less bulkiness, Or directly in a reduction in separation energy.

Figure 5:
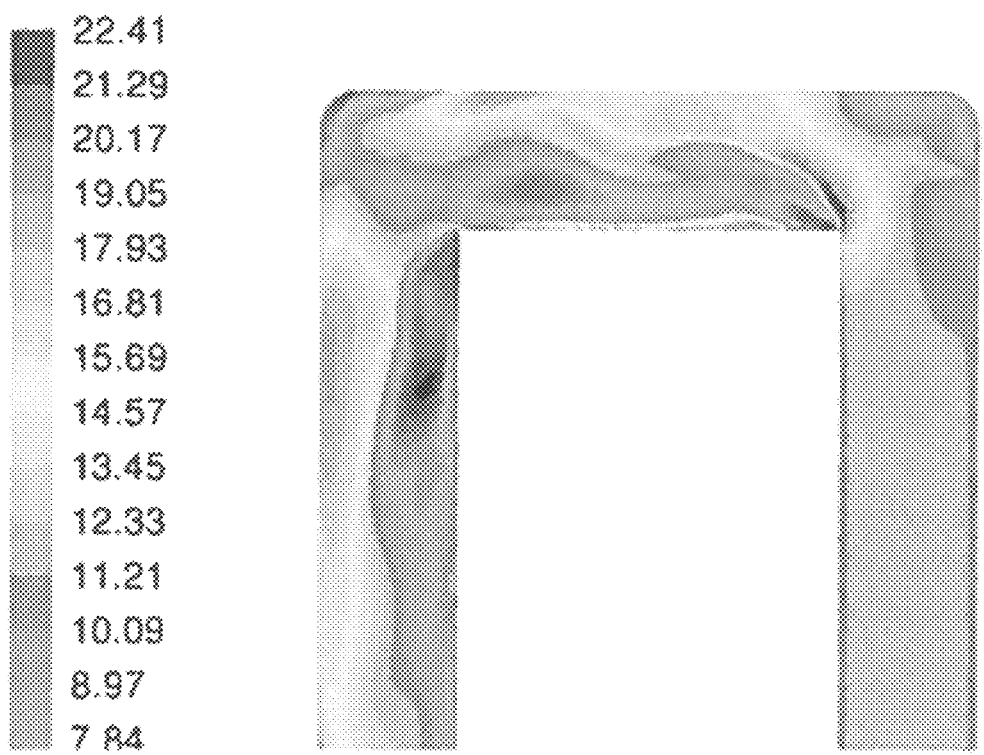
FIG. 5 illustrates the velocity in m/s of the fluids in a bend without vanes.
Figure 6:
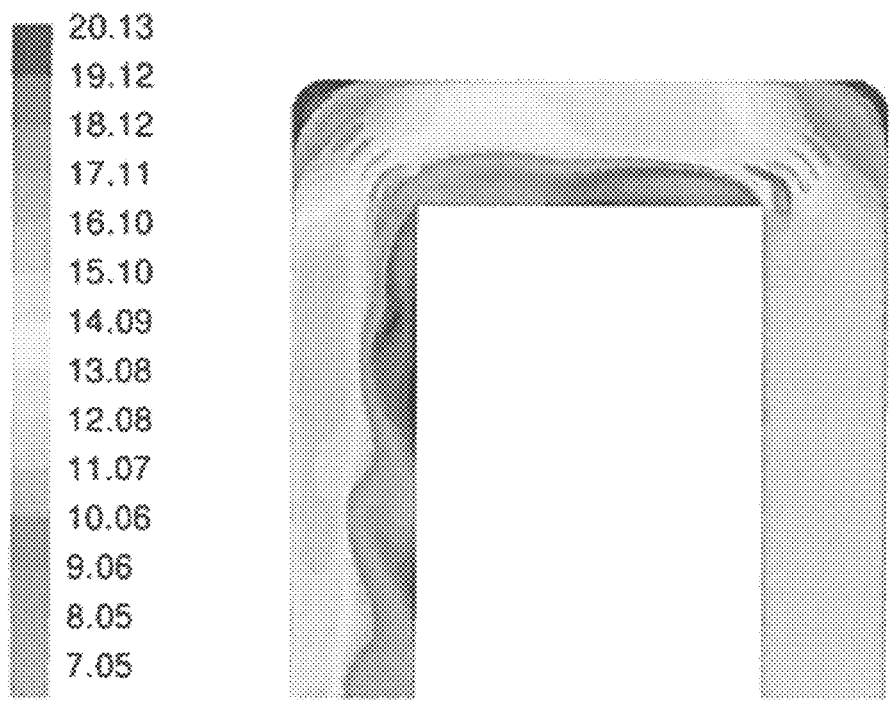
FIG. 6 illustrates the velocity in a bend according to the invention with vanes.

Finally, the presence of curved vanes inside the bend has the effect of stabilizing the fluid, disrupted by a change in direction, more rapidly downstream. Fluid dynamics studies by digital solving of equations make it possible to visualize this effect. FIG. 5 illustrates the velocity in m/s of the fluids in a bend without vanes and FIG. 6 illustrates the velocity in a bend according to the invention with vanes.

In this case, two bends are illustrated, but the pipe may comprise a single bend Certain elements of the pipework, in particular the flow meter devices, have minimal upstream straight length requirements in order to be able to operate correctly. This is because in order to obtain sufficiently uniformized velocity profiles in the fluid passage section to allow an accurate measurement of flow rate, a certain length is required.

The use of a vane bend could thus reduce these lengths and improve the outline of the pipework.

This type of bend can also be envisaged on pipework for liquids, upstream of cryogenic pumps, for which it is known that reducing the pressure drop upstream of the pump is an essential operating element (Net Positive Suction Head).

At least one dimension of the isolated chamber is reduced, compared with that of an isolated chamber surrounding a pipe of the same diameter not having vanes.

The pressure drop of the fluid caused by the change in direction in the bend is less than that generated during the change in direction in the line if said line was not equipped with vanes.

Finally, the vane bends have an actual economical advantage since they make it possible either to save energy or to save in terms of investment; their compactness and their performance quality make it possible to reduce the size of the cold box.

Figure 7:
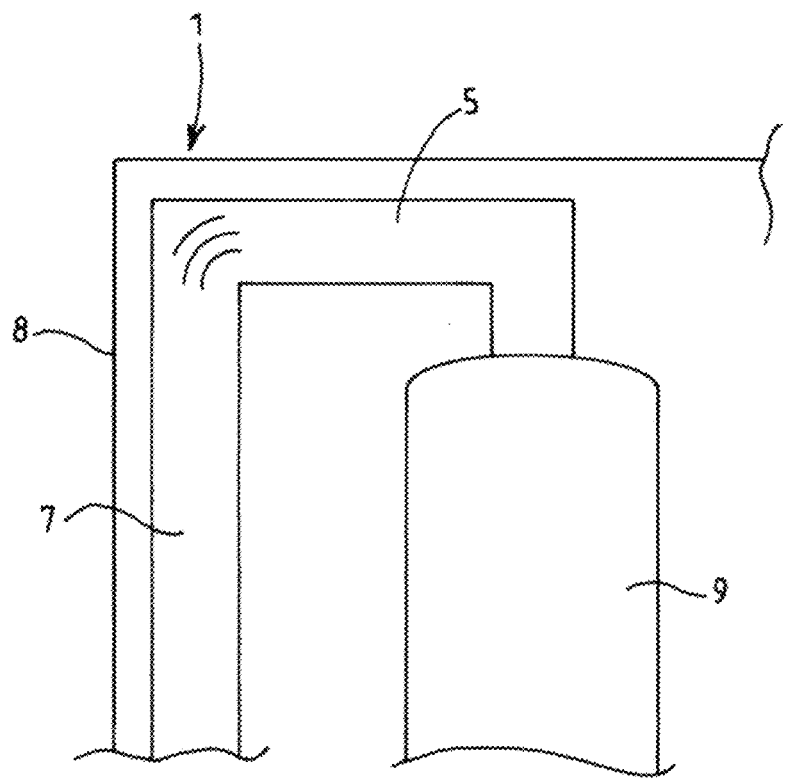
FIG. 7 illustrates a chamber according to the invention.

FIG. 7 shows a partial view of an isolated chamber 8 containing a distillation column 9 which is the low-pressure column of a double column for air separation. The low-pressure nitrogen pipe 5 comprises a bend 1 which makes it possible to send the nitrogen vertically towards the bottom of the pipe. The use of vanes makes it possible to reduce the size of the chamber since the bend takes up less space.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An apparatus for the separation or liquefaction of a gas at cryogenic temperatures, the apparatus comprising:
   an isolated chamber having at least one element operating at cryogenic temperatures, the element being a distillation column, and
   a pipe configured to transfer fluid coming from or going to the at least one element, the pipe having a diameter D comprising a bend for changing the direction of flow of the fluid, wherein:
   a. the bend does not comprise a curvature and forms a right angle, or alternatively comprises a curvature for which the ratio of the radius of curvature R to the diameter D of the pipe is less than (0.5 D+x)/D where x is equal to 0 or greater than 0 and less than 0.5 D,
   b. profiled deflector vanes are placed inside the bend, with their concavity towards the centre of the bend forming a plurality of parallel curved ducts,
   wherein at least one vane extends out of the pipe.

2. The apparatus according to claim 1, comprising at least two vanes aligned parallel to one another along the bisector of the bend.

3. The apparatus according to claim 1, wherein the bend forms a right angle.

4. The apparatus according to claim 1, in which the fluid is gaseous air to be separated which is sent via the pipe to the distillation column.

5. The apparatus according to claim 1, in which the fluid is gaseous nitrogen which comes from the distillation column.

6. The apparatus according to claim 1, in which the diameter D of the pipe is greater than 101.6 cm.

7. The apparatus according to claim 1, in which the bend is located between the element and a wall of the chamber.

8. The apparatus according to claim 1, wherein the bend comprises a curvature and the ratio of the radius of curvature R to the diameter D of the pipe is less than 0.7.

9. The apparatus according to claim 1, in which a footprint of the bend is less than 1.5 D.

10. The apparatus according to claim 1, in which a footprint of the bend is less than 1.2 D.

* * * * *